United States Patent [19]
Copeland

[11] 3,872,941
[45] Mar. 25, 1975

[54] EQUALIZER BAR OSCILLATION STOP AND PROTECTIVE GUARD

[75] Inventor: Kermit L. Copeland, Bellevue, Ill.

[73] Assignee: Caterpillar Tractor Co., Peoria, Ill.

[22] Filed: Jan. 23, 1974

[21] Appl. No.: 435,753

[52] U.S. Cl............................ 180/9.5, 280/104.5 A
[51] Int. Cl............................................. B62d 55/08
[58] Field of Search......... 180/9.5, 9.52, 9.54, 9.56, 180/9.58, 9.6, 9.62; 280/111, 112 A, 112 R

[56] References Cited
UNITED STATES PATENTS
2,978,050  4/1961  Risk.................................... 180/9.5
3,177,003  4/1965  Tantlinger................... 280/104.5 B
3,547,462  12/1970  Stamm........................ 280/104.5 A Primary Examiner—Philip Goodman

[57] ABSTRACT

An improved equalizer bar oscillation stop and protective guard structure ffor use with track-type tractors. An equalizer bar, supported on a resilient rubber-like mass, extends between the track frames of a tractor and engages the main frame of the tractor such that the latter can rock thereon. Customary upper stop members on the main frame for engaging the upper surface of the bar are augmented by lower stop members below the bar so as to prevent overcompression of the rubber-like mass and thereby extend the useful life thereof.

7 Claims, 5 Drawing Figures

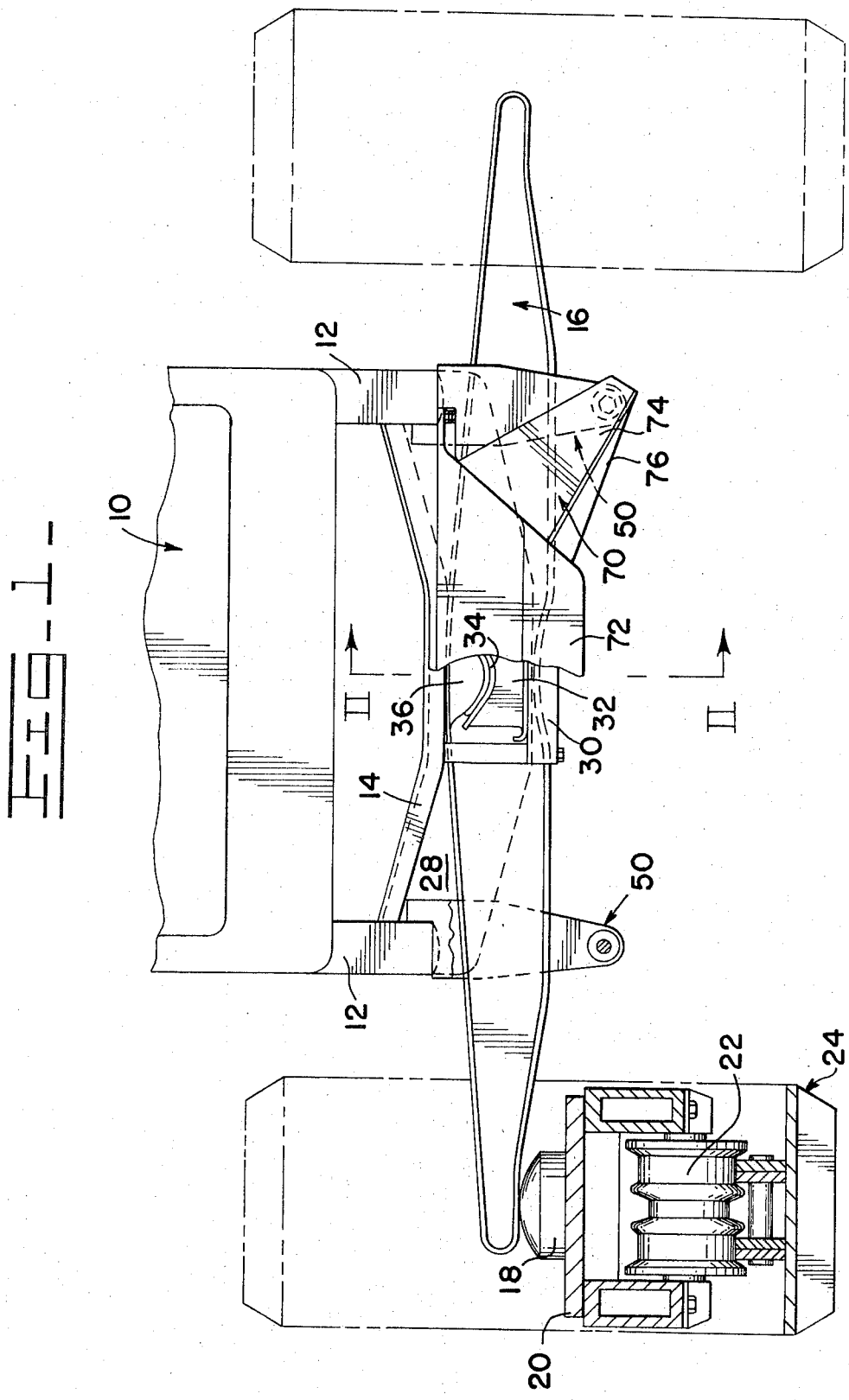

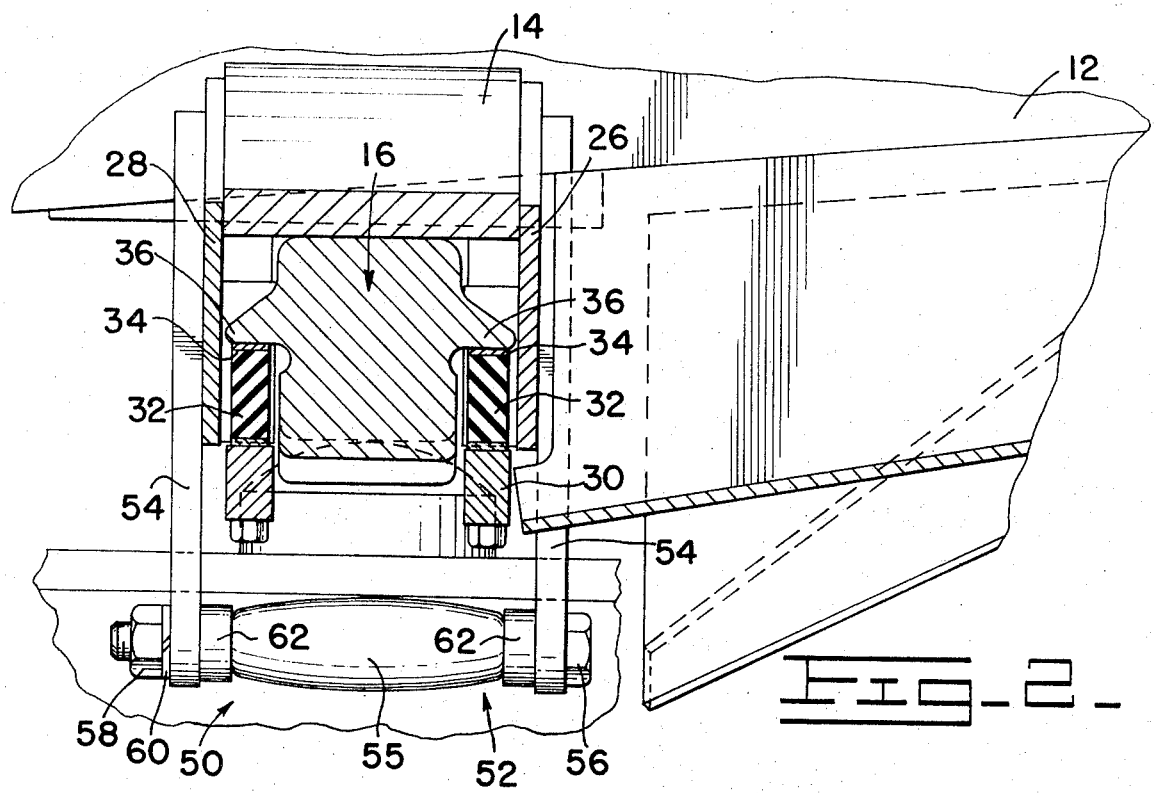
Fig_2_
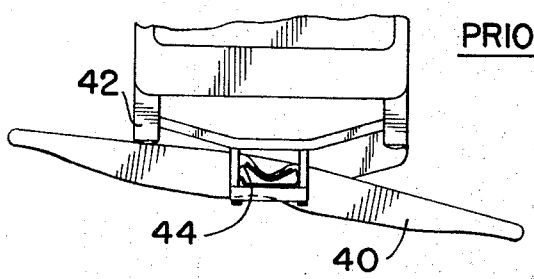
Fig_3_
PRIOR ART
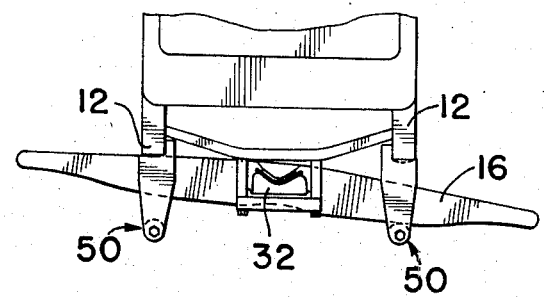
Fig_4_

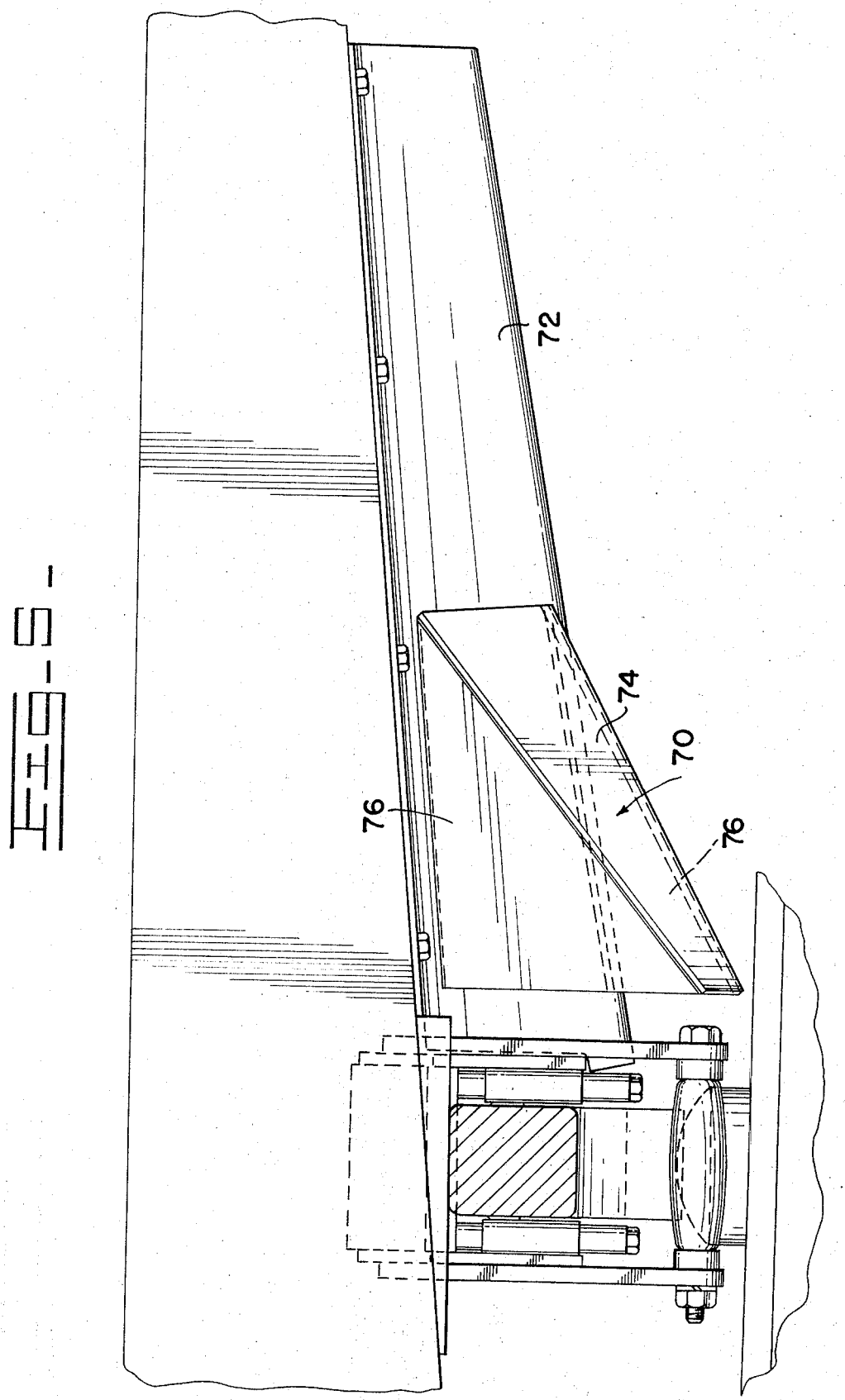

EQUALIZER BAR OSCILLATION STOP AND PROTECTIVE GUARD

BACKGROUND OF THE INVENTION

This invention relates to suspensions for track-type tractors and, more particularly, to such suspensions employing equalizer bars, the rocking of which is resisted by a rubberlike mass of material in engagement with the equalizer bar. Relevant prior art includes U.S. Pat. Nos. 1,715,055; 2,022,080; 2,034,135; 2,150,433; 2,233,627; 2,474,514; 2,978,050; 3,096,840; 3,010,530; and 3,576,226.

In Risk et al. U.S. Pat. No. 2,978,050 there is disclosed a front end suspension for tractors which has been employed commercially with great success by the assignee of the instant application. Because of such success of the Risk et al. structure in actual use for several years, it has been considered that further improvements would enhance its already substantial usefulness.

SUMMARY OF THE INVENTION

It is the principal object of the invention to provide a new and improved front end suspension for tractors. More specifically, it is an object of the invention to provide an improved front end suspension of the type disclosed by Risk et al. in the above identified patent to further increase its usefulness.

The exemplary embodiment of the invention achieves the foregoing objects through the addition, in a front end suspension substantially as shown by Risk et al., of a pair of lower stop means, one on each side of the longitudinal center line of the tractor for engaging, alternately, the underside of the equalizer bar. Such stop means act in concert with an opposite one of an upper stop means, which may conveniently be main frame members, to limit rocking movement of the equalizer bar relative to the tractor main frame to thereby avoid overcompression of the rubber-like cushion provided by Risk et al. to resist such rocking movement. By limiting the rocking movement, the rubber-like cushions are subject to less compression with the result that their useful life is substantially extended.

In the preferred embodiment, each of the lower stop means is defined by a U-shaped member. The legs of each U-shaped member are secured to the main frame on opposite sides of the equalizer bar and the bight of the U-shaped member defines the stop. In a preferred ebodiment, the bight is defined by a hollow stop member having a barrel-like exterior configuration and a bolt impaling the same and extending between the two legs.

The invention also contemplates the provision of downwardly extending, wing-like box section guards secured to the crank case guard for the tractor. The wing-like guards extend below the lower stop means to protect the same against contact with objects embedded in the terrain over which the tractor may travel.

Other objects and advantages will become apparent from the following specification taken in conjunction with the accompanying drawings.

DESCRIPTION OF THE DRAWINGS

FIG. 1 is a fragmentary front elevation of a tractor embodying the invention with parts broken away for clarity;

FIG. 2 is an enlarged sectional view taken approximately along the line 2—2 of FIG. 1;

FIG. 3 is a somewhat schematic illustration of the Risk et al. structure at one extreme position of movement;

FIG. 4 is a somewhat schematic view of a structure made according to the invention at the same extreme of movement; and FIG. 5 is a fragmentary side elevation.

DESCRIPTION OF THE PREFERRED EMBODIMENT

An exemplary embodiment of the invention is illustrated in FIG. 1 and is seen to include a tractor, generally designated 10, having a pair of main longitudinal frame members 12. The frame members 12 are interconnected by a transverse frame member 14 which rests upon the upper surface of an equalizer bar, generally designated 16. The ends of the equalizer bar 16 engage the upper surfaces of pads 18 on truck frames 20 which, in turn, mount track roller assemblies 22 in engagement with a conventional track and shoe assembly, generally designated 24.

As seen in FIGS. 1, 2 and 5, front and back plates 26 and 28 secured to the cross member 14 in depending relation flank the equalizer bar 16 to preclude shifting of the same longitudinally of the tractor center line.

Also depending from the cross member 14 and between the plates 26 and 28, are subframes or blocks 30 constructed as disclosed in the above identified Risk et al. patent for the purpose of supporting rubber-like masses 32 on opposite sides of the equalizer bar 16. Each of the masses 32 is provided, at its upper end, with a V-shaped wear plate 34 which receives a corresponding V-shaped projection 36 integral with the equalizer bar 16 and extending outwardly from a corresponding side thereof.

The masses 32, wear plates 34 and projections 36 serve the same function as the cushions, wear plates and plates identified in the Risk et al. patent as elements 33, 34 and 26, respectively. In general, the purpose is to resist rocking of the tractor 10 relative to the equalizer bar 16 by compressing the masses 32 during such rocking movement. Accordingly, to this end, the foregoing elements are located generally medially of the tractor 10, i.e., along the longitudinal center line thereof.

Referring now to FIG. 3, a prior art equalizer bar 40 is shown in one extreme position of rocking movement. Specifically, further rocking movement is resisted by contact of the upper surface of the equalizer bar 40 with a main frame member 42 which serves as a stop for such rocking movement. However, because the only positive stop is the frame member 42, it will be seen that a rubber-like mass 44 corresponding to those identified as 32 herein, is substantially compressed and deformed. Such substantial compression of the rubber-like mass 44 in the prior art structure provides the desired resisting force to such rocking action. However, in the specific case illustrated in FIG. 3, the substantial deformation of the mass 44 attendant such compression is not required to provide a satisfactory rocking resisting force with the result that the degree of deformation and compression is greater than required. Since the useful life of the rubber-like mass 44 depends upon the degree to which it is stressed during use, and since the extreme case illustrated in FIG. 3 allows some deformation and compression that effectively serves no practical purpose, it has been determined that by eliminating such unnecessary deformation and compression, the useful life of the structure can be substantially increased.

With reference now to FIGS. 1, 2 and 4, a means for eliminating such unnecessary deformation and compression will be described. As can be seen in FIG. 1, stop members, generally designated 50, are secured to the frame members 12 in depending relation and located below the equalizer bar 16 for the purpose of engaging the underside thereof to limit the degree of rocking motion permitted to a point where such unnecessary deformation and compression will not occur.

With reference specifically to FIG. 2, each stop member 50 is seen to include a U-shaped member, generally designated 52, having legs defined by spaced vertically extending plates 54 each of which is secured at its upper end to a corresponding one of the plates 26 and 28 as by welding and/or to a corresponding one of the frame members 12. The bight of each U-shaped member 52 is defined by a hollow stop 55 which will be engaged by the underside of the equalizer bar in an extreme limiting position of movement. Each stop 55 has a barrel shape exterior and is held in place by a bolt 56 extending through aligned apertures in the plates 54 to receive a nut 58 and a lock washer 60. Spacers 62 may also be employed. With such structure, should it be necessary to replace the stop 55, the same may easily be removed by removing the bolt 56.

As can be seen in FIG. 4, an equalizer bar 16 in the structure forming applicant's invention is seen in an extreme position of movement corresponding approximately to that shown in FIG. 3. In this case, the upper surface of the equalizer bar 16 has engaged one of the frame members 12 at the underside thereof, which frame member 12 also serves as a stop. The opposite end of the equalizer bar 16 has engaged one of the stop members 50. The rubber-like mass 32 is adequately compressed to provide the requisite rocking resisting force but, as can be readily ascertained from a comparison of FIGS. 3 and 4, the degree of deformation and compression of the mass 32 is substantially less than that of the mass 44. As a result, the mass 32 will have a substantially longer useful life through the provision of the lower stop means 50.

To preclude damage to the lower stop means 50, guards are provided therefor. As can be seen in FIG. 1, one such guard, generally designated 70, depends from the tractor 10 to a point below an associated one of the stop means 50 so that, as the tractor moves forwardly, should an object embedded in the terrain over which the tractor travels, be in a position to cause damage to the stop means 50, it will first encounter the guard 70 which will either cause the object to be pushed below a level whereat it would strike the stop means 50 or cause the tractor 10 to cam itself over the object without causing damage to the stop means 50.

In a preferred embodiment, the guards 70 are secured to the customary guard 72 for the crank case of the engine of the tractor 10. As can be seen in FIG. 5, each guard 70 is a tapered, boxed section, wing-like extension of the crank case guard 72. The same is formed of rugged steel plates secured together to define a forwardly located surface 74 which descends rearwardly and a pair of side sections 76. In general, the plate 74 will contact the terrain embedded object to provide the previously described action. It will also be observed that the triangular configuration of the plates 76 provide substantial reinforcing strength for the plate 74.

Preferably, the guards 70 are secured in the aforementioned location as by welding.

From the foregoing, it will be seen that the invention provides a suspension for a tractor including a resilient cushion which prevents separation of the equalizer bar and the cross member during normal rolling contact and yet provides protection for the cushioning to extend the useful life thereof.

It will also be recognized that the preferred form of lower stop means herein disclosed are ideally suited to be attached on a tractor in the field, requiring only welding or the like. The actual stop members in the lower stop means may be readily replaced if required while the guards 70 afford maximum protection for the stop means when the tractor is operating in extremely rugged terrain.

I claim:

1. In a front end suspension for track-type tractors having a main frame flanked by truck frames on opposite sides, a rigid bar bridging the truck frames adjacent their forward ends, a cross member on the main frame resting centrally on the bar for rocking movement thereon, a mass of rubber-like material engaging the bar generally centrally with respect to the longitudinal center line of the tractor for resisting such rocking movement, and a pair of upper stop means on the main frame, one on each side of said center line, for engaging the upper surface of the bar to partially restrict such rocking movement, the improvement comprising, a pair of lower stop means secured to said frame, one on each side of said center line, and located below said bar for engaging the underside of said bar so as to act in concert with said upper stop means to fully restrict such rocking movement to thereby preclude overcompression of said rubber-like mass thereby extending the useful life thereof.

2. Apparatus according to claim 1 further including plate-like guard means secured to said main frame and depending therefrom forwardly of said lower stop means to provide protection for said lower stop means against contact with embedded objects in the terrain over which said tractor may travel.

3. Apparatus according to claim 1 wherein each said lower stop means is defined by a U-shaped member having its legs located on opposite sides of said bar and secured to said main frame and its bight disposed below said bar to contact the undersurface thereof.

4. Apparatus according to claim 3 wherein the bight of said U-shaped member is defined by a hollow stop member impaled upon a bolt spanning said legs.

5. Apparatus according to claim 4 wherein said hollow stop member has an exterior, barrel-shaped surface.

6. Apparatus according to claim 1 wherein said rubber-like mass is supported by a subframe secured to said main frame along said center line, said lower stop means being independent of said subframe.

7. Apparatus according to claim 1 wherein said tractor further includes a depending crank case guard, and lower stop means guards configured as tapered, box section, wing-like extensions secured to said crank case guard and extending below said lower stop means to protect said lower stop means from contact with objects embedded in the terrain over which said tractor may travel.

* * * * *